UNITED STATES PATENT OFFICE.

DAVID E. BREINIG, OF BROOKLYN, N. Y., ASSIGNOR TO THE BRIDGEPORT WOOD FINISHING COMPANY, OF BRIDGEPORT, CONN.

IMPROVEMENT IN PAINTS.

Specification forming part of Letters Patent No. 193,636, dated July 31, 1877; application filed March 1, 1877.

*To all whom it may concern:*

Be it known that I, DAVID E. BREINIG, of Brooklyn, Kings county, and State of New York, (assignor to the BRIDGEPORT WOOD FINISHING COMPANY, a corporation established under the laws of the State of Connecticut, and located at Bridgeport, in said State,) have invented a new and useful Improvement in the Art of Painting; and I hereby declare that the following is a full, clear, and exact description thereof.

Pine timber, and also many hard woods, contain pitch and sap, which exposure to the sun or artificial heat draws to the surface, no matter how many coats of paint may be thereon; consequently, the paint is discolored, and the timber loses its life, absorbs moisture, expands, and the paint cracks and peels off. If the wood is not exposed to the atmosphere, artificial heat, sooner or later, causes dry-rot.

Linseed-oil is the life-giving power to paint. As soon as the oil leaves the pigment, its efficiency as a wood-preserver is lost, and it comes off in scales or powder.

In spreading ordinary paint upon wood, the oil is more or less absorbed, and to that extent its purpose is defeated, and in a short time the paint cracks, peels, or "chalks" off. As soon as the oil leaves it, the paint begins to disintegrate.

The object of my invention, therefore, is to produce an article that will preserve both wood and paint by forming upon wood, or any other material, an impervious coat, which will harden into a covering of artificial stone that will not crack, chip, peel off, or disintegrate; hence its name "lithogen" or "stone-forming" primer.

In preparing the lithogen primer, I use the metalline gum prepared with a metallic salt, as described in my Patent No. 54,462, in connection with common japan, made of linseed-oil and resinous gums, red lead, litharge, or oxide of manganese. They are to be boiled together.

First, I take one hundred pounds silicic acid, five pounds oxide of zinc, and five pounds carbonate of lime in a pulverized form. I place them in a mixing-tub, and add three gallons of japan, and two pounds of metalline gum to each gallon of japan, boiled together. When well mixed, I grind it in any ordinary paint-mill. This produces what I call No. 1.

Secondly, I place one hundred pounds of No. 1 in a mixing-tub, and add thirteen pints of japan, three pounds of metalline gum, boiled together, and thirteen pints of spirits of turpentine, or its equivalent. When thoroughly combined, it may be run into suitable packages for the market.

I apply it, as ordinary paint, with a brush. One coat is sufficient.

I do not confine myself to the above proportions. Any other pigments in connection with zinc will answer to give color, as may be desired.

What I claim as my invention, and desire to secure by Letters Patent, is—

The composition herein described, consisting of silicic acid, oxide of zinc, carbonate of lime, japan, metalline gum, and spirits of turpentine, substantially as set forth.

D. E. BREINIG.

Witnesses:
JOHN W. RIPLEY,
GEORGE D. RIPLEY.